Feb. 14, 1933.  S. N. BUCHANAN  1,897,186
GROUNDING FITTING
Filed May 15, 1930   2 Sheets-Sheet 1
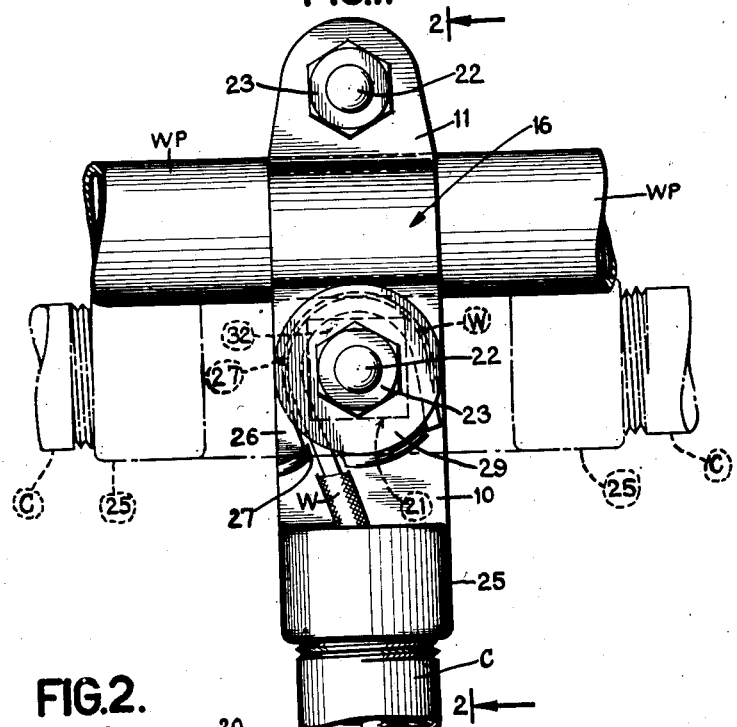
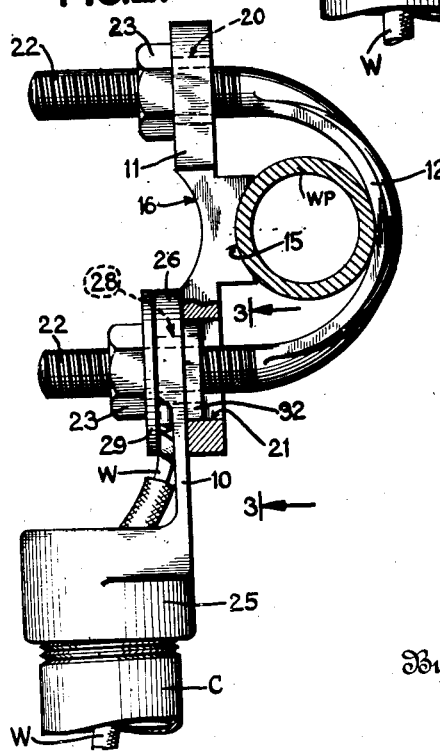
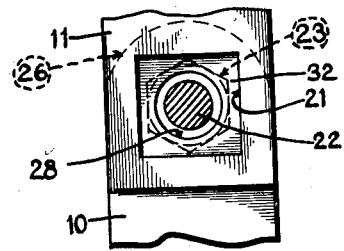
Inventor
STEPHEN N. BUCHANAN
By his Attorney
John M. Montstream

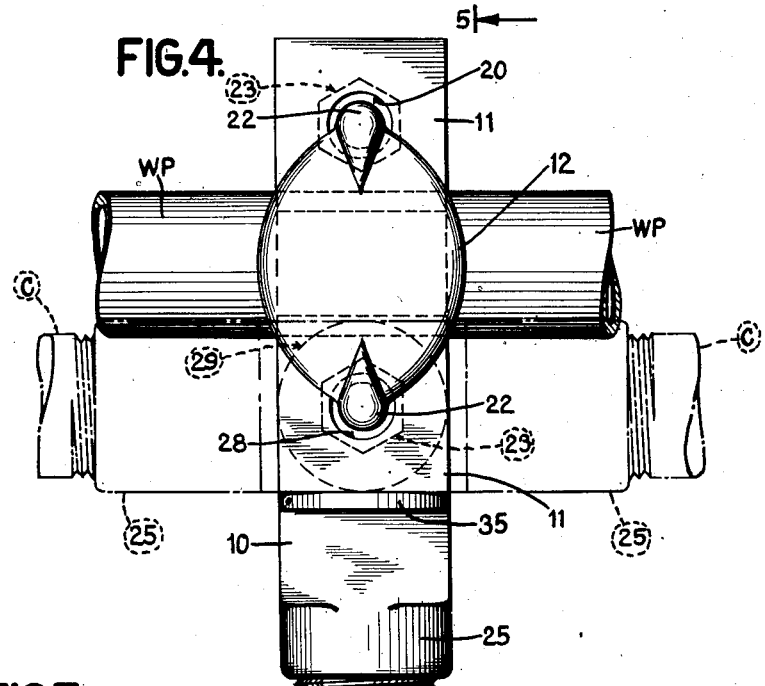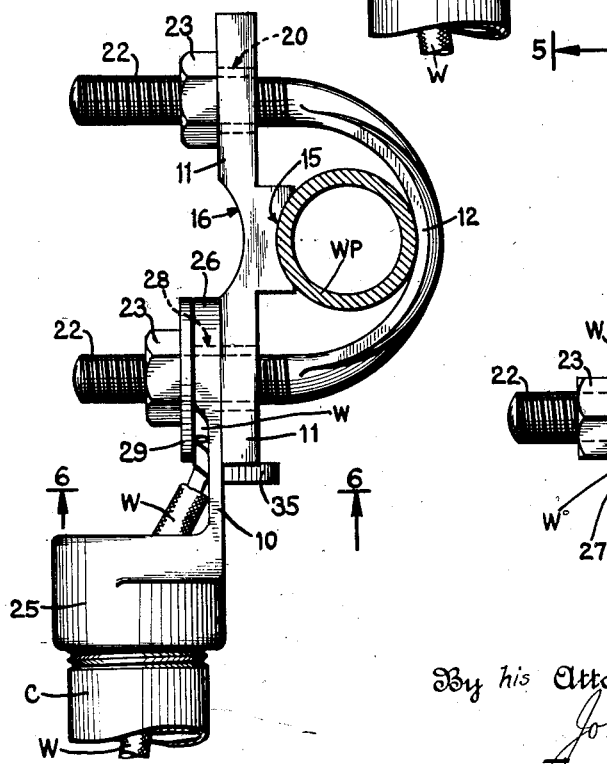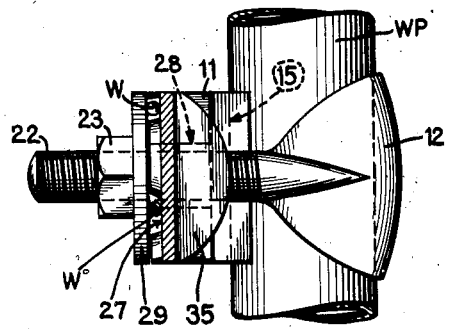

Patented Feb. 14, 1933

1,897,186

UNITED STATES PATENT OFFICE

STEPHEN N. BUCHANAN, OF ELIZABETH, NEW JERSEY, ASSIGNOR TO THE THOMAS & BETTS CO., OF ELIZABETH, NEW JERSEY, A CORPORATION OF NEW JERSEY

GROUNDING FITTING

Application filed May 15, 1930. Serial No. 452,570.

This invention relates to grounding fittings by means of which a conduit pipe is electrically connected to some grounded structure such as a water pipe, in order to electrically ground a wire carrying conduit system.

An object of the invention is to construct a grounding fitting of two members, one of which is anchored to an electrical conduit and the other is clamped to a grounded pipe and in which the two members may be assembled together into a predetermined or limited number of angular positions relatively to each other in which positions the two parts are positively locked against displacement.

Another object of the invention is to construct a grounding fitting having two parts, one of which is anchored to a conduit and the other is clamped to a grounded pipe in which a predetermined number of angularly disposed faces are provided upon one of the members and means are provided upon the other member to engage at least one of the angular faces to positively lock the two members together against angular displacement in selected angular position.

Other objects of the invention will be apparent from the following description taken in connection with the accompanying drawings in which:

Figure 1 shows the assembled grounding fitting anchored to an electrical conduit pipe and clamped to a grounded pipe, such as a water pipe, in which the two parts of the fitting have three selective positions relative to each other, two of such positions being shown in dot and dash lines and the third being shown by the solid lines.

Figure 2 shows the grounding fitting as viewed from line 2—2 of Figure 1 with a partial section through the adjustable means by which the relative angular relation of the two parts of the grounding fitting may be adjusted into any one of the three positions shown in Figure 1.

Figure 3 shows the means by which the two members of the grounding fitting may be assembled together relatively to each other in one of a predetermined or limited number of angular positions and positively locked against displacement in the selected position.

Figure 4 shows the grounding fitting in which a modified form of the means by which the two members of the fitting may be assembled together in a predetermined number of angular positions relatively to each other and positively locked in selected position.

Figure 5 shows the modified construction of the grounding fitting of Figure 4 as viewed along the line 5—5.

Figure 6 shows the modified construction of the means by which selective positioning and locking of the two members is obtained as viewed from line 6—6 of Figure 5.

Electrical conduit systems wherein the electrical wires pass through metallic conduit should be positively grounded in order to safeguard such systems against dangerous short circuits in case the insulation upon the wire passing through the conduit breaks down or some exposed wire should inadvertently make contact with the conduit or other electrical fitting comprising a part of the system. Such conduit systems are ordinarily grounded through water pipes as the most convenient and effective method of grounding the entire conduit system. Grounding fittings for such systems therefore provide a conduit anchorage means and a pipe clamping means to clamp the fitting to some grounded structure which is usually a water pipe. Inasmuch as various sizes of water pipes are used in buildings, the pipe clamping means is preferably provided with sufficient flexibility, or some other provision is made, to enable the grounding fitting to be anchored to the various sizes of pipes found in buildings and construction work generally.

Again the conduit pipe which is desired to be grounded through a water pipe or other grounded structure, may sometimes approach at right angles to the water pipe and at other times run parallel with the water pipe. A grounding fitting in order to be capable of meeting each situation, should be constructed so that the two members, one of which is provided with conduit anchorage means and the other member is provided with water pipe clamping means, may be angularly adjusted relatively to each other. Even though the members carrying the conduit anchorage means and the water pipe clamping means are adjustable relatively to each other, it is also desirable that these two members remain positively fixed or locked in selected relative position when assembled together.

The grounding fitting of this invention consists of two parts, namely, the electrical conduit anchorage member 10 and a pipe clamping member which consists of a seat member 11 and a U-shaped clamping strap 12. The seat member 11 is provided upon its one side with an arcuate seat 15 adapted to receive a water pipe WP of a certain diameter. Upon the other side of the seat member 11 is a second curved or arcuate seat 16 adapted to receive a water pipe of a different diameter from that which may be received in the arcuate seat 15. The seat member 11 is also provided with a hole or opening 20 and a square hole or opening 21 through which the threaded shanks 22 of the water pipe clamping strap 12 project respectively. A nut 23 upon each shank 22, engages with the seat member 11 to clamp the water pipe WP between one of the seats, such as seat 15, and the clamping strap 12. Obviously by turning the seat member 11 about, the seat 16 may be used to clamp a larger diameter pipe in the pipe clamping member.

The conduit anchorage member 10 has a threaded ring 25 to receive the threaded end of a conduit pipe C. The threaded ring 25 is merely illustrative of the preferred construction of the conduit anchorage means and it is contemplated by this invention to provide any type of means for anchoring conduit thereto. The conduit anchorage member 10 is securely anchored by means of the threaded connection to the conduit pipe C which also serves as a good electrical grounding connection. A boss 26 upon the member 10 has a wire groove 27 in which groove the end of the wire W is received and clamped. The wire W passes through the conduit pipe C and serves as a ground wire. A hole 28 passes through the boss 26 for the shank 22 of the water pipe clamping strap 12. A washer 29 is adapted to be positioned between the nut 23 and the boss 26 to engage and firmly clamp the wire W in the wire groove 27.

The conduit anchorage member and the water pipe clamping member are adapted to be secured together in any one of several different angular positions depending upon whether the relative axial positions of the conduit pipe C and the water pipe WP is at right angles or parallel, and if parallel whether the conduit pipe extends from the right or the left of the water pipe. In order to enable selective angular adjustment of the two members to meet each of these conditions, the conduit anchorage member 10 is provided with a square projection or boss 32 concentric with the shank passage 28 through the end of the member 10 and the boss 26. The projection or boss 32 is adapted to fit into the square opening 21 in the pipe clamping seat 11 so that when the square projection 32 is inserted in the square hole 21, the two parts are locked together in selected position. It is clear that by this construction the conduit anchorage member 10 may be selectively positioned with respect to the pipe clamping seat 11 so that the axis of the conduit anchorage ring 25 is at right angles to the water pipe clamping seats 15 and 16, or by lifting the square boss 32 out of the square hole 21, the conduit anchorage member 10 may be positioned and locked in one of two positions at right angles thereto, as shown in Figure 1 by the dot and dash lines.

A modified construction of selective adjustable locking means between the pipe clamping member and the electrical conduit anchorage member is shown in Figures 4 to 6 inclusive. In this construction the pipe seat member 11 is provided with a square end and with side edges at right angles thereto. The conduit anchorage member 10 has a locking flange 35 projecting therefrom and adapted to engage the end or side edges of the seat member 11. This locking flange 35 abutting the end or side edges of the pipe seat member 11 enables the conduit anchorage member 10 to be locked in selected angular position relatively to the pipe clamping member. By this construction the conduit anchorage member 10 may also be positioned at right angles from the position shown in Figure 1, as shown by the dot and dash lines in Figure 1, in which case the locking flange 35 engages one of the side edges of the pipe seat member 11 and is securely locked against displacement as a result of the engagement of these two parts. In all other respects the construction of the grounding fitting is identical with that shown in Figures 1 to 3 inclusive and the description of this construction will therefore not be repeated with respect to the modified construction of Figures 4 to 6 inclusive.

It will be observed that the edges or faces of the square opening 21 provide angularly disposed edges in the pipe clamping member which edges are engaged by the edges of the square projection or boss 32 of the conduit anchorage member 10. Although the projection 32 is square and engages all four edges of the square opening, it is clear that the projection 32 need not be square and need engage only one edge of the opening 21 in order to lock the two members together in selected angular position. In other words, this construction is not essentially different from that shown in Figures 4 through 6 and in its broad view provides a projection upon one member which engages at least one of several angularly disposed faces or edges upon the other to lock the two members together against angular displacement. Similarly it is within the scope of this invention to provide additional faces or edges disposed angularly to each other in order to provide additional selective angular positions between the conduit anchorage member and the pipe clamping member and yet have edges with a sufficiently broad face to securely lock the members together in selected position against angular displacement.

Having described my invention it is to be understood that the invention is not intended to be limited by the specific description or disclosure in the drawings herein, excepting as limited in the accompanying claims.

What is claimed is:

1. A grounding fitting comprising a conduit receiving member, anchorage means to anchor a conduit thereto, a member having a seat upon opposite sides thereof to receive grounded pipes of different diameters, means to clamp the grounded pipe thereto, angularly disposed faces upon one of said members, means upon the other member engaging at least one of the angularly disposed faces of the other member irrespective of which seat is in clamping position thereby locking these two parts against angular displacement, and means to secure the two members together.

2. A grounding fitting comprising a conduit receiving member, anchorage means to anchor a conduit thereto, a member having seats upon opposite sides thereof to receive grounded pipes of different diameters, means to clamp the grounded pipe thereto, a recess through the grounded pipe receiving member having a plurality of angularly disposed faces, a projection upon the other member fitting into the recess from either side thereof irrespective of which seat is in clamping position and engaging the angularly disposed faces, and means to secure the members together.

3. A grounding fitting comprising a conduit receiving member, anchorage means to anchor a conduit thereto, a member having a seat upon opposite sides thereof to receive grounded pipes of different diameters, means to clamp the grounded pipe thereto, angularly disposed faces upon the end of one of said members, a projection upon the other member adapted to engage one of said faces irrespective of which seat is in clamping position to lock the members against angular displacement, and means to secure the members together.

4. A grounding fitting comprising a conduit receiving member, anchorage means to anchor a conduit thereto, a member to receive a grounded pipe, U-shaped clamping means to clamp the grounded pipe thereto, angularly disposed faces upon one of said members, means upon the other member engaging at least one of the angularly disposed faces of the other member thereby locking these two parts against angular displacement, and one of the arms of the U-shaped clamp securing the two members together.

5. A grounding fitting comprising a conduit receiving member, anchorage means to anchor a conduit thereto, a member having a seat upon opposite sides thereof to receive grounded pipes of different diameters means to clamp grounded pipes of different diameters thereto, a square hole through the grounded pipe receiving member, a square projection upon the other member adapted to fit into the square hole irrespective of which seat is in clamping position to lock the members against angular displacement in any one of three positions, and means to secure the two members together.

6. A grounding fitting comprising a conduit receiving member, anchorage means to anchor a conduit thereto, a member to receive a grounded pipe, U-shaped clamping means to clamp the grounded pipe thereto, a square hole in one of said members, a square projection upon the other member adapted to fit into the square hole to lock the members against angular displacement in any one of three positions, and one of the arms of the U-shaped clamping member extending through the hole and projection to secure the members together.

In testimony whereof I affix my signature.

STEPHEN N. BUCHANAN.